(12) United States Patent
Pachner

(10) Patent No.: US 8,423,334 B2
(45) Date of Patent: Apr. 16, 2013

(54) DISTRIBUTED MODEL IDENTIFICATION

(75) Inventor: Daniel Pachner, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 186 days.

(21) Appl. No.: 12/782,004

(22) Filed: May 18, 2010

(65) Prior Publication Data

US 2011/0288828 A1 Nov. 24, 2011

(51) Int. Cl.
*G06G 7/48* (2006.01)

(52) U.S. Cl.
USPC .......................................................... 703/6

(58) Field of Classification Search .. 703/6; 700/28–32, 700/50
See application file for complete search history.

(56) References Cited

U.S. PATENT DOCUMENTS

| | | | | |
|---|---|---|---|---|
| 5,745,597 | A | * | 4/1998 | Agazzi et al. ................. 382/182 |
| 6,047,221 | A | * | 4/2000 | Piche et al. ..................... 700/44 |
| 8,019,701 | B2 | * | 9/2011 | Sayyar-Rodsari et al. ..... 706/12 |
| 2004/0249483 | A1 | | 12/2004 | Wojsznis et al. |
| 2008/0235166 | A1 | | 9/2008 | Sayyar-Rodsari et al. |
| 2009/0319059 | A1 | | 12/2009 | Renfro et al. |

* cited by examiner

*Primary Examiner* — Eunhee Kim
(74) *Attorney, Agent, or Firm* — Seager Tufte & Wickhem LLC.

(57) ABSTRACT

A method and system for identifying a distributed model for a nonlinear system represented by a block diagram. The distributed model identification can be achieved by first replacing all signal links across the block diagram with elastic links by augmenting each input port of a plurality of blocks with a signal generator that produces a replacement signal value ($s_{ig}$) for the value received by each of the plurality of blocks. Thereafter, the difference between the received value and the replacement signal values can be calculated and outputted as an auxiliary signal to control elasticity of the elastic links. Then, instead of global identification of the block diagram parameters, i.e. treating the diagram as a whole, the block parameters are identified locally based on the local data. Simultaneously, the auxiliary output signals are forced to vanish. Consequently, the solution found is also a solution to the global identification method.

20 Claims, 2 Drawing Sheets

DISTRIBUTED MODEL IDENTIFICATION

TECHNICAL FIELD

Embodiments are generally related to control systems monitoring, diagnostics, real time optimization, or control system design. Embodiments are also related to the creation of mathematical models of a control technology. Embodiments are further related to the distributed model identification of a complex nonlinear system.

BACKGROUND OF THE INVENTION

The creation of a simplified mathematical model of a controlled technology is generally the first step in control system monitoring, diagnostics, or real time optimization system design. A system's success greatly depends on model accuracy and reliability. Whereas the controller or optimizer algorithms are usually generic, well tested and then reused across multiple applications, the models usually have to be created or calibrated anew with each application. For example, a passenger car engine control unit will not work correctly in a different car model with a different engine type, though the control algorithm can actually be identical. Model creation and calibration represents a bottleneck within control system design. For many modem model based control approaches, the model is in fact the main parameter (apart from penalties and constraints) which parameterizes a generic controller for the given application.

Most reliable models are obtained from the first principles: mechanical, thermodynamic, chemical, and other laws. Such models naturally obey the mass or energy conservation laws, etc. Any such law imposes additional constraint on the identification problem thus eliminating uncertainty of the problem (often equivalent to the number of unknowns). Consequently, first principle models can be calibrated using smaller data sets compared to the data sets required for purely empirical black box models (i.e. a model of a system for which there is no a priori information available). Typically, the first principle models exhibit greater prediction error towards the data set used for the calibration when compared to the black box models. But the opposite is usually true when comparing the model prediction accuracy on a data set not used for the calibration (i.e. extrapolating the model behavior further from the calibration data). Models derived from the first principles can still have a number of unknown parameters. To identify their values is called the "grey box identification problem" (to distinguish it from the black box identification, where the model structure is arbitrary and not derived from the physical laws).

There are two approaches to the grey box model identification of complex large scale nonlinear systems: local method and global method. Utilizing the local method, individual components (blocks or subsystems in the block diagrammatic representation) are fitted separately using their local input and output data, whereas in the global method all components are fitted simultaneously while always evaluating the predictions of the whole system. The global method can begin with local identification and then use the results as the initial condition for the global method. There are advantages to both approaches. For example, the local method has better convergence properties while the global method is statistically more efficient. Therefore, the inventors believe a need exists for a new method which combines advantages of both in addition to providing additional benefits.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is one aspect of the present invention to provide for a method of distributed model identification for a nonlinear system represented as a block diagram.

It is another aspect of the present invention to provide for an improved method of distributed model identification for a nonlinear system represented as a block diagram by replacing all signal links across the block diagram with elastic links by augmenting each input port of the blocks with a signal generator that produces a replacement signal value ($s_{ig}$) for the value received by each of the blocks.

It is another aspect of the present invention to calculate the difference between a received value and a replacement signal value and output the difference as an auxiliary signal to control elasticity of the elastic links of a block diagram. During the identification process, the absolute values of the auxiliary signals are gradually minimized up to zero.

The aforementioned aspects and other objectives and advantages can now be achieved as described herein. A method of distributed model identification for a nonlinear system represented as a block diagram is disclosed. The distributed model identification is achieved by first replacing all signal links across the block diagram with elastic links by augmenting each input port of a plurality of blocks with a signal generator that produces a replacement signal value ($s_{ig}$) for the value received by each of the plurality of blocks. Then the difference between the received value and the replacement signal value is calculated and outputted as an auxiliary signal to control elasticity of the elastic links.

During the identification of the modified block diagram, both parameters and initial conditions of the auxiliary signal generators are manipulated to achieve two goals simultaneously: 1) set the diagram outputs as close to the data as possible, and 2) annihilate all differences between sent and received signal values. This problem can be separated into local optimization of the block parameters to achieve fit of the block outputs to the local data and global coordination of the signal generators to achieve the zero auxiliary outputs. The global identification results are sought solving a series of local identification problems to match the sent and received signal values, thus minimizing their absolute differences.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the current description so as not to obscure the present invention.

Figure 1:
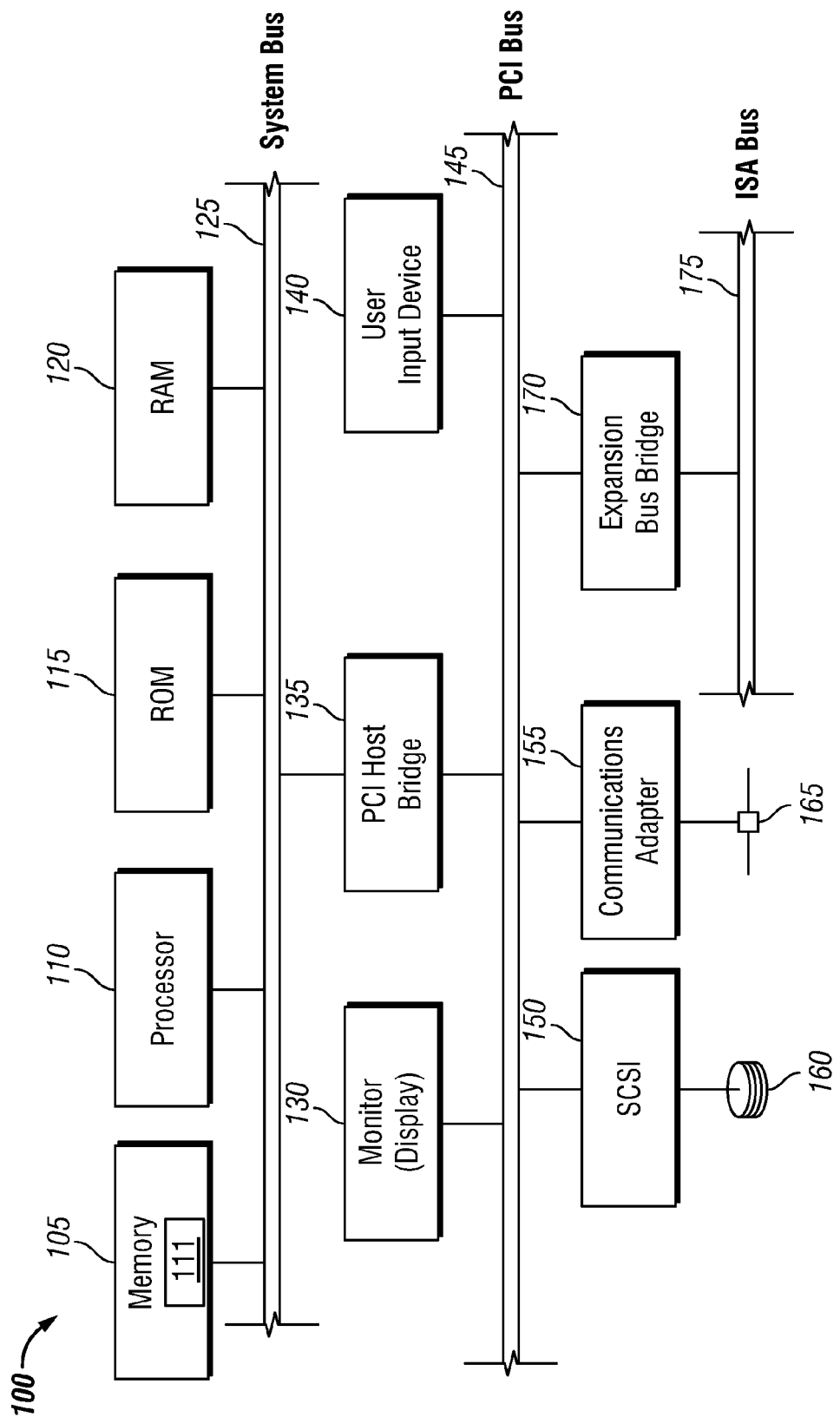
FIG. 1 illustrates an exemplary data-processing apparatus, which can be utilized for the generation of block diagrams of control systems, in accordance with a preferred embodiment.

FIG. 1 illustrates a data-processing apparatus 100 which can be utilized for the generation of representative block diagrams of control systems in accordance with the disclosed embodiments. Note that the data-processing apparatus 100 includes the use of one or more software modules. Software modules generally include instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and contains the source code that actually implements the routines or subroutines upon which the module is based. The term "module" as utilized herein can therefore generally refer to software modules or implementations thereof. Such modules can be utilized separately or together to form a program product that can be implemented through signal-bearing media, including transmission media and/or recordable media. An example of such a module is module 111 depicted in FIG. 1.

It is important to note that, although the embodiments are described in the context of a fully functional data-processing system (e.g., a computer system), those skilled in the art will appreciate that the mechanisms of the embodiments are capable of being distributed as a program product in a variety of forms, and that the present invention applies equally regardless of the particular type of signal-bearing media utilized to actually carry out the distribution. Examples of signal bearing media include, but are not limited to, recordable-type media such as USB drives, DVD disks, CD-ROM disks, and other transmission-type media such as analogue or digital communications links.

Referring to the drawings and in particular to FIG. 1, a memory 105, a processor (CPU) 110, a Read-Only memory (ROM) 115, and a Random-Access Memory (RAM) 120 are generally connected to a system bus 125 of apparatus 100. Memory 105 can be implemented as, for example, a ROM, RAM, a combination thereof, or simply a general memory unit. Module 111 can be stored within memory 105 and then retrieved and processed via processor 110 to perform a particular task. A user input device 140, such as a keyboard, mouse, or another pointing device, can be connected to PCI (Peripheral Component Interconnect) bus 145.

The data-processing apparatus 100 depicted in FIG. 1 can include CPU 110, ROM 115, and RAM 120, which can be coupled to a Peripheral Component Interconnect (PCI) local bus 145 through a PCI host-bridge 135. The PCI Host Bridge 135 can provide a low latency path through which processor 110 may directly access PCI devices mapped anywhere within bus memory and/or input/output (I/O) address spaces. PCI Host Bridge 135 also provides a high bandwidth path for allowing PCI devices to directly access RAM 120.

Also attached to PCI local bus 145 are communications adapter 155, small computer system interface (SCSI) 150, and expansion bus-bridge 170. Communications adapter 155 is utilized for connecting data-processing apparatus 100 to a network 165. SCSI 150 is utilized to control high-speed SCSI disk drive 160. Expansion bus-bridge 170, such as a PCI-to-ISA bus bridge, may be utilized for coupling ISA bus 175 to PCI local bus 145. Note that PCI local bus 145 can further be connected to a monitor 130, which functions as a display (e.g., a video monitor) for displaying data and information for a user and for interactively displaying a graphical user interface (GUI).

Note that the term "GUI" (Graphical User Interface) generally refers to a type of environment that represents programs, files, options, and so forth by means of graphically displayed icons, menus, and dialog boxes on a computer monitor screen. A user can interact with the GUI to select and activate such options by pointing and clicking with a user input device such as, for example, a pointing device such as a mouse, and/or with a keyboard. A particular item can function in the same manner to the user in all applications because the GUI provides standard software routines (e.g., module 111) to handle these elements and reports the user's actions.

In creating a block diagram to describe a control system, the component or subsystem parameters are usually fitted individually to their input and output data. Such component level calibration is not optimal and does not utilize all the information content in the measurements. To illustrate this assertion, model calibration can be represented as a general constrained optimization problem wherein a signal link connecting diagram blocks represents an equality constraint and the value produced by a block equals value accepted by other block. These constraints can be referred to as "structural constraints". In the Cartesian product of parameters and signals, the probability is zero at points which violate the structural constraints.

Figure 2:
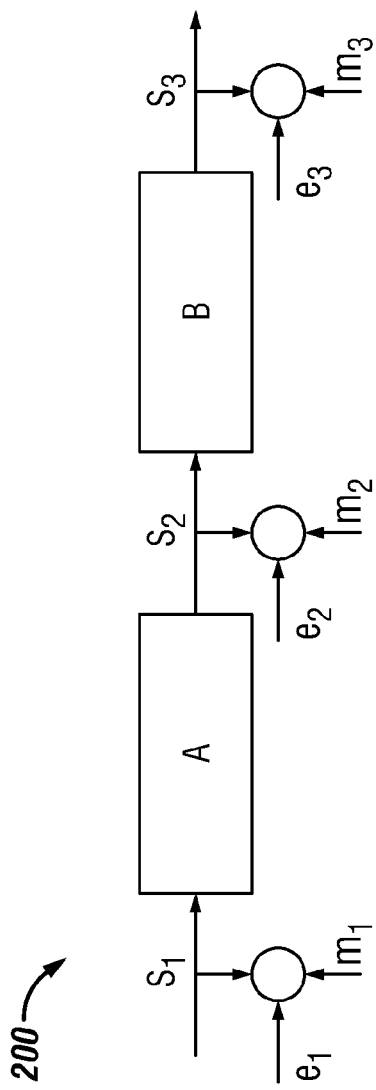
FIG. 2 illustrates a block diagram of a cascade of two subsystems A and B, in accordance with the disclosed embodiments.

FIG. 2 illustrates a block diagram 200 of a cascade of two atomic functional blocks or subsystems A and B, in accordance with the disclosed embodiments. The signal $s_1$ is processed by A to $s_2$ and finally $s_2$ by B to produce $s_3$. The measurements m can be different from the theoretically correct yet unknown values s. The differences m−s are denoted as e (the set of all e values will herein be represented as E). The E and the unknown block parameters represent random (uncertain) variables. Using the Bayesian paradigm, the prior probability distribution can be defined in the Cartesian product of E and A, B unknown parameters. This prior probability distribution and the block diagram represent the statistical model of the identification problem.

The block diagram structural constraints and the constraints defined by the values of measurements can be combined with the prior information to define the posterior probability distribution of e and A, B parameters. In this diagram, the structural and measurement constraints are the following equalities:

$$A(m_1-e_1)=m_2-e_2^a$$

$$B(m_2-e_2^b)=m_3-e_3$$

$$e_2^a=e_2^b \quad (1)$$

Here, the $e_2$ is split into two versions, a and b, which are found to be identical. Thus the prior probability is defined in this Cartesian product P of the following sets: the sets A and B represent sets of all possible parameter values and set E represents all e signal values.

$$P=E_1\times E_2^a\times E_2^b\times E_3\times A\times B \quad (2)$$

The identification problem searches for an element of the above Cartesian product set P with respect to certain optimality index, e.g. maximum posterior probability solution. The relative probabilities of the P elements are given by the prior information whereas the structural constraints set the probability to zero except of the points satisfying the equality constraints. The prior probability annihilation is the manner in which the information content in the measurements is projected to the information about the model parameters.

In this setting, the difference between the local identification and the global identification is exposed. The local block level calibration does not use the last equality constraint in Equation (1). This indicates that the probability will not be set to zero for certain elements in P, namely for elements which satisfy constraints 1-2 but not 3 in Equation (1). This also indicates that the unknown parameter values are sought in a larger set P also among combinations of signal and parameter values which should have been excluded from the search because they have zero posterior probability. Searching over this larger set certainly results in a greater mean estimation error.

Consequently, the estimation error is increased whenever the subsystems are treated separately because not all structural constraints have been respected. The best mean estimation accuracy would be expected when the model parameters are optimized, thus minimizing the prediction error of the block diagram as a whole, or globally.

The above demonstrates that the global identification method should have better accuracy over the local identification method. Unfortunately, the global method typically has a more narrow convergence set. It can be shown that the structural constraints, which improve the accuracy, also add a number of local solutions (number of local extremes of the optimization problem). Therefore, the global minimum of the global identification is a better estimate, but it may be more difficult or impossible to find it via a convex numerical optimization method such as the gradient method. The global identification method can also have problems with numerical stability.

Difficulty arises in evaluating nonlinear block diagram predictions simply because evaluation requires a numerical solution for its differential equations. For block diagrams with feedback paths, the solution may be unstable or even finite escape time (some signals hit infinity values in a finite time). Comparatively, the subsystem or block level identification only requires solution of the subsystems which is generally much simpler, faster and more reliable. Solving block equations separately is faster than solving all of them simultaneously when coupled with the structural constraints.

Moreover, some of the subsystems may have limited domain. It means some input values may not be allowed. For example, most temperature signals will not accept values below the absolute zero because the first principles do not have any physical meaning for temperatures below absolute zero. If such illegal values are used formally in the formulae, they often cause overflow (e.g. division or log of zero), complex or undefined results. Many first principle laws are discontinuous on the domain boundary. For example, consider the division atomic block with its domain D:

$$s_o = \frac{1}{s_i}, s_i \in (0, \infty) = D \quad (3)$$

The convergence may be lost if the input to the division block is not one of the external inputs to the block diagram, but is, instead, an internal signal generated by other blocks with unknown parameters and the initial $s_i$ sign is incorrect. The fitting criterion value is likely to be infinite at $s_i=0$. Then clearly, the convex optimization method can never cross the domain boundary. In other words, $s_i$ sign will not be changed by the identification. Note that it is not effective to change the division block as follows:

$$s_o = \frac{1}{\max\{s_i, \varepsilon\}}, \varepsilon > 0 \quad (4)$$

This results in annihilation of the gradient $ds_o/ds_i$ for $s_i \leq \varepsilon$ and consequently, causes the optimization to stop updating anything that could change $s_i$ values. With the local identification, this is less of a problem as the subsystem inputs are more under control. Hence, the input signal values $s_i \leq 0$ would not be used for the identification.

Based on the above considerations, there exists a need to combine the advantages of the local and global identification methods. The most straightforward and widely used method is based on starting the global identification from the initial condition provided by the local identification. Herein is described a more complete solution: distributed identification. This method replaces the signal value equality constraints with soft penalization of the signal differences. In other words, instead of the signal values provided by sending block outputs being necessarily identical to the values received by the receiving block inputs, an embodiment of the present invention seeks to minimize the signals' absolute difference. As such, the signal difference can become the global cost function which is subject to optimization. Thus, the signal value used by a receiving input does not necessarily equal to value sent by a block output during the identification process. A signal link in the block diagram does not represent a single value, but two values. An analogy in the mechanical arts would be using elastic couplings between the blocks instead of rigid ones. The elasticity of the links can be controlled by how much difference is allowed between the sent and received values. After the identification is completed, the received signal values should equal the sent values and the found solution is a solution of the global identification.

Figure 3:
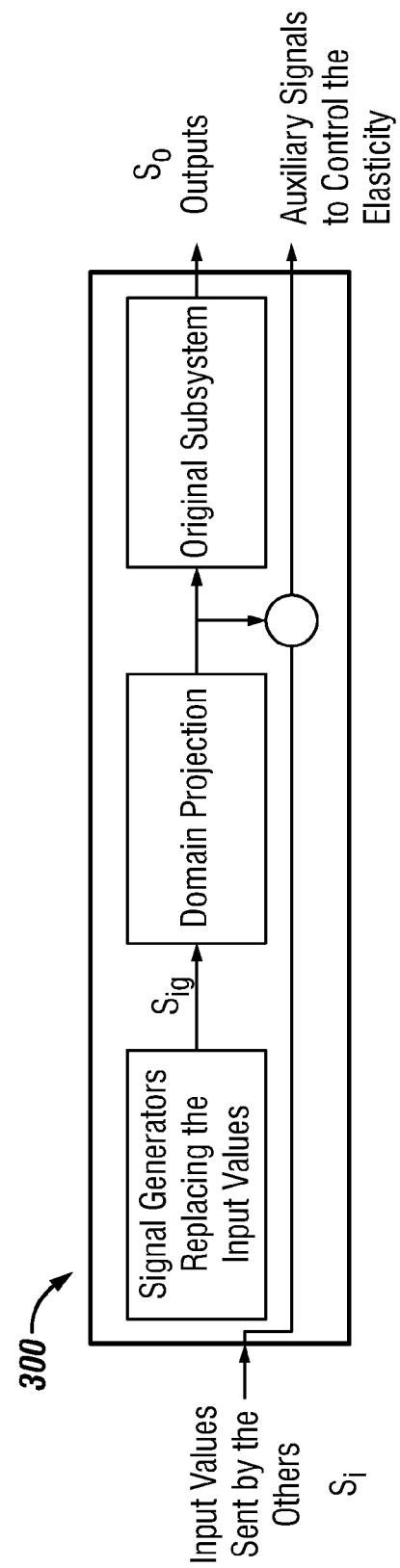
FIG. 3 illustrates a high-level flow chart indicating logical operational steps of a method for distributed model identification, in accordance with the disclosed embodiments.

FIG. 3 illustrates a method 300 for distributed model identification wherein each input port of each atomic block is modified with a signal generator in order to replace all signal links across a block diagram with the elastic links. The signal generator provides the replacement signal value for the value received. The difference between the received value and the replacement signal value is output to control the link elasticity.

The block modification can be expressed as follows, Block A operating on the input signal vector $s_i$:

$$s_o(t) = A(s_i(t)) \quad (5)$$

It will be replaced with the same block augmented by the signal generator $s_{ig}$ and an auxiliary output $s_a$:

$$s_o(t) = A(s_{ig}(t)), s_{ig}(t) \in D$$

$$s_a(t) = s_{ig}(t) - s_i(t) \quad (6)$$

The generated $s_{ig}$ is an unknown function of time and it has to be limited to the block A domain D. The simplest signal generator can be used if the block diagram is fitted towards the steady state data. In this case, $s_{ig}$ is simply an unknown constant vector. The differences between the sent and received values add extra degrees of freedom which are exactly those degrees of freedom which create the difference between the local and global block diagram identification approaches.

For the cascade of two blocks A and B, splitting the signal $s_2$ into two sent and received values causes the block B to be fitted with input values not necessarily equal to the A output. This is the local identification method. When the signals $s_a$ are zero, then the local identification method solution also becomes solution of the global method. Fitting the elastic block diagram and using the $s_a$ norm as the objective function, it is possible to make smooth transitions from the local to global identification, which combines the advantages of the two. Moreover, the extra degree of freedom can be used to push all inputs to the respective domains all the time (if B would be the division block, for example). Otherwise, it would be nontrivial to guarantee the domain satisfaction as the B block input value may be a complicated function of A block parameters. This becomes even more complicated in block diagrams with feedback paths. Also, note that the elastic block diagram cannot become unstable or finite escape time if all signal generators and all elementary subsystems are stable, even with feedback paths present.

The distributed identification can be achieved when modifying all elementary modeling blocks as shown in FIG. 3. Instead of using the input values sent by the other blocks or input externally, the replacement signal values are used. The replacement signal values are projected to the domain of the original subsystem so that the values sent there are always valid. It should be noted that there are no feedback loops possible in the block diagram because the inputs have no direct impact on the outputs. They are coupled only via auxiliary output minimization.

It should be noted that if the block input is outside the domain, the gradient is not annihilated because the blocks, which are sending the input signals, are still governed to provide in-domain signals via the auxiliary signals minimization. The auxiliary signals vanish only if all block inputs are in the respective domains. Nonetheless, the gradient with respect to the outputs of the ancestor block parameters may get zeroed.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method of optimizing a distributed model for a nonlinear system represented by a block diagram having two or more interconnected atomic blocks, wherein each of the atomic blocks includes at least one input port for receiving an input signal ($s_i$) via a corresponding signal link, and each atomic block represents a subsystem of the nonlinear system, said method comprising:
    replacing at least some signal links in said block diagram with elastic links, wherein each elastic link augments the corresponding input port with a signal generator that produces a replacement signal ($s_{ig}$) that replaces the input signal ($s_i$);
    for each elastic link, calculating a difference between said input signal ($s_i$) and said replacement signal value ($s_{ig}$); and
    for each elastic link, outputting said difference as an auxiliary signal ($s_a$).

2. The method of claim 1, wherein each replacement signal ($s_{ig}$) is forced to be a valid input signal to the corresponding atomic block according to a block domain (D) of the corresponding atomic block.

3. The method of claim 1 further comprising configuring said auxiliary signals ($s_a$) in a global cost function.

4. The method of claim 1 wherein said block diagram is stable when said signal generator is stable and all of said blocks are stable.

5. The method of claim 1 further comprising coupling said input signals ($s_i$) received and said replacement signals ($s_i$) via an auxiliary minimization function.

6. The method of claim 5 wherein said auxiliary minimization function produces in-domain input signals ($s_i$).

7. The method of claim 5 wherein each of said elastic links produces a corresponding output signal ($s_o$) and auxiliary signal ($s_a$).

8. A non-transitory computer-usable storage media for distributed model identification for a nonlinear system represented by a block diagram including two or more interconnected blocks, wherein each of the interconnected blocks includes at least one input port for receiving an input signal ($s_i$) via a corresponding signal link, said non-transitory computer-usable storage media embodying computer program code, said computer program code comprising computer executable instructions configured for:
    replacing at least some signal links across said block diagram with elastic links, wherein each elastic link augments the corresponding input port with a signal generator that produces a replacement signal ($s_{ig}$) that replaces the input signal ($s_i$);
    for each elastic link, calculating a difference between said input signal ($s_i$) and said replacement signal ($s_{ig}$); and
    for each elastic link, outputting said difference as an auxiliary signal.

9. The non-transitory computer-usable storage media of claim 8 further comprising configuring said replacement signal ($S_{ig}$) to comprise an unknown function of time and limited to a block domain (D).

10. The non-transitory computer-usable storage media of claim 8 further comprising minimizing the auxiliary signals.

11. The non-transitory computer-usable storage media of claim 8 wherein said block diagram is stable when said signal generators are stable and all of said blocks are stable.

12. The non-transitory computer-usable storage media of claim 10 further comprising minimizing said auxiliary signals using a global cost function.

13. The non-transitory computer-usable storage media of claim 12 wherein said minimizing said auxiliary signals is constrained by also producing in-domain input signals.

14. The non-transitory computer-usable storage media of claim 8 wherein each of said elastic links produces a corresponding output signal ($s_o$) and auxiliary signal ($s_a$).

15. A system for optimizing a distributed model for a nonlinear system represented by a block diagram having a plurality of interconnected atomic blocks, wherein each of the atomic blocks includes at least one input port for receiving an input signal ($s_i$) via a corresponding signal link, and each atomic block represents a subsystem of the nonlinear system, comprising:
    a data-processing apparatus comprising a module configured to:
        replace at least some signal links in said block diagram with elastic links, wherein each elastic link augments the corresponding input port with a signal generator that produces a replacement signal ($s_{ig}$) that replaces the input signal ($s_i$);
        for each elastic link, calculate a difference between the input signal ($s_i$) and said replacement signal ($s_{ig}$); and
        for each elastic link, output said difference as an auxiliary signal ($s_a$).

16. The system of claim 15 wherein said module is further configured to limit said replacement signal ($s_{ig}$) to a domain (D) of the corresponding atomic block.

17. The system of claim 15 wherein said module is further configured to minimize said auxiliary signals ($s_a$) using a global cost function.

18. The system of claim 15 wherein said block diagram is stable when said signal generators are stable and all of said atomic blocks are stable.

19. The system of claim 15 wherein said module is further configured to couple the input signals ($s_i$) and said replacement signals ($s_t$) via an auxiliary minimization function.

20. The system of claim 15 wherein each of said elastic links produces a corresponding output signal ($s_o$) and auxiliary signal ($s_a$).

\* \* \* \* \*